United States Patent [19]
Masuda et al.

[11] Patent Number: 5,738,184
[45] Date of Patent: Apr. 14, 1998

[54] MUFFLER FOR A TWO-STROKE ENGINE

[75] Inventors: Isao Masuda, Tachikawa; Shigeru Sato, Sayama; Yasuharu Sato, Fussa; Kengo Kubo, Hamura, all of Japan

[73] Assignee: Kioritz Corporation, Tokyo, Japan

[21] Appl. No.: 773,978

[22] Filed: Dec. 26, 1996

[30] Foreign Application Priority Data

Apr. 5, 1996 [JP] Japan .................. 8-084324

[51] Int. Cl.$^6$ ............................................ F01N 1/08
[52] U.S. Cl. .................... 181/262; 181/272; 181/283; 60/299
[58] Field of Search .......................... 181/230, 231, 181/240, 258, 259, 262, 263, 265, 269, 272, 282, 283; 60/289, 290, 293, 298, 299, 302

[56] References Cited

U.S. PATENT DOCUMENTS

| | | | |
|---|---|---|---|
| 4,579,194 | 4/1986 | Shiki et al. | 181/262 X |
| 4,867,270 | 9/1989 | Wissmann et al. | 181/262 X |
| 5,338,903 | 8/1994 | Winberg | 181/258 X |
| 5,431,013 | 7/1995 | Yamaki et al. | 181/262 X |
| 5,457,290 | 10/1995 | Sase et al. | 181/258 |

FOREIGN PATENT DOCUMENTS 5343930  10/1978  Japan .

*Primary Examiner*—Khanh Dang
*Attorney, Agent, or Firm*—Baker & Botts, L.L.P.

[57] ABSTRACT

A muffler for a two-stroke internal combustion engine has an expansion chamber into which a rush of exhaust gas is introduced from the engine. In the vicinity of an exhaust gas inlet from the engine into the expansion chamber, the muffler has an external air intake for external air to be suctionally introduced into the expansion chamber by the rush of exhaust gas. With the external air introduced, carbon monoxide (CO) emission into the ambient is reduced.

6 Claims, 13 Drawing Sheets

1

MUFFLER FOR A TWO-STROKE ENGINE

BACKGROUND OF THE INVENTION

1. Field of the Invention

The present invention relates to a muffler for a small air-cooled two-stroke internal combustion engine which is preferably used in a small-sized hand-held working machine such as a brush cutter or chain saw. In particular, it relates to such a muffler which has an oxidation catalyst member incorporated therein in order to conform to regulations of exhaust gas.

2. Description of the Prior Art

Recently, with increasing environmental awareness, even in a small air-cooled two-cycle gasoline engine which is used in a hand-held working machine such as a brush cutter or chain saw, it is desired to depollute exhaust gas discharged therefrom by reducing HC, CO, NOx and the like contained in the exhaust gas. For example, according to a California regulation of exhaust gas bill "CARB 1999", it will be required to reduce CO, total HC (THE) and NOx contents of exhaust gas to not higher than 130 g/bhp-h, 50 g/bhp-h and 4 g/bhp-h, respectively, from the year 1999 onward.

To conform to such regulations of exhaust gas, there have been various proposals, for example, to improve the shape of an intake port, exhaust port or scavenging port of a combustion chamber or cylinder of an internal combustion engine, and to incorporate an exhaust gas cleaning means such as an oxidation catalyst member into an exhaust system. However, none of the proposals has provided satisfactory results.

As measures for conforming to regulations of exhaust gas, the present inventors have previously proposed mufflers each of which is externally mounted on a body of an internal combustion engine so as to directly introduce a rush of exhaust gas from an exhaust port of the internal combustion engine into the muffler, and which has an oxidation catalyst member incorporated in the muffler in a specific manner for cleaning the exhaust gas. Specifically, a muffler has been proposed with an oxidation catalyst assembly disposed therein which is made by fitting an oxidation catalytic member in the form of a catalytic cloth over a spark arresting wire mesh, and covering the peripheral edge of the oxidation catalyst member entirely or in substantial part with side walls on the periphery of the wire mesh to form a substantially U- or truncated V shaped oxidation catalyst member (conventional example 1 as disclosed in Japanese Patent Application No. 272959/1995). Another proposed muffler has an oxidation catalyst member comprising a gas-permeable porous metallic member which is disposed at an exhaust gas introducing port of the muffler (conventional example 2 as disclosed in Japanese Patent Application No. 343092/1995).

However, in these conventional examples 1 and 2 the structure of the muffler itself, and the material, shape and placement of the oxidation catalyst member and the like do not necessarily contribute to the achievement of an intended level of exhaust gas cleaning performance. Further, no particular measures are taken to improve mounting properties of the muffler on an internal combustion engine, assembling properties, degree of freedom in design, and the like. In addition, no particular attention is paid to the difficulties of temperature increase due to the reaction (combustive oxidation) of the exhaust gas under the catalytic action of the oxidation catalyst member.

The assignee of the present invention have carried out investigations for further improved mufflers, and as a result,

2 the assignee have developed a muffler constructed as follows (Japanese Patent Application No. 84260/1996). The muffler has an expansion chamber into which a rush of exhaust gas from an exhaust port of an internal combustion engine is introduced, a partition plate by which the expansion chamber is vertically divided into first and second expansion chambers, and an oxidation catalyst member made of a gas-permeable porous metallic material which is provided on the partition plate for leading the exhaust gas from the first expansion chamber through the oxidation catalyst member into the second chamber.

In this muffler, it has been confirmed in particular that THC content of the exhaust gas is significantly reduced as compared with the conventional examples 1 and 2. However, a satisfactory result has not been obtained in reducing CO content.

This may be attributable to the following fact.

For reducing CO content of exhaust gas, it is required to react CO with $O_2$ to form $CO_2$ ($CO+\frac{1}{2}O_2 \rightarrow CO_2$). However, since the exhaust gas resulting from combustion of air-fuel mixture in the cylinder of the internal combustion engine is further subject to oxidation (combustion) in the first and second expansion chambers under the oxidation promoting action (combustion promoting action) of the oxidation catalyst member, the exhaust gas in the second expansion chamber no longer contains sufficient $O_2$. In consequence, the reaction of $CO+\frac{1}{2}O_2 \rightarrow CO_2$ cannot proceed sufficiently, thereby failing to reduce CO content satisfactorily.

It is an object of the present invention to provide a muffler for a two-stroke engine which effectively reduces CO content of an exhaust gas by means of a relatively simple structure.

SUMMARY OF THE INVENTION

The muffler for a two-stroke engine according to the present invention comprises an expansion chamber with an exhaust gas introducing port for introducing a rush of an exhaust gas from an exhaust port of the internal combustion engine into the expansion chamber, the muffler being provided with an external air intake means in the vicinity of the exhaust gas introducing port in the expansion chamber for suctionally introducing external air into the expansion chamber by means of the rush of the introduced exhaust air.

A preferred form of the external air intake means comprises a Venturi tube with a throat and an external air introducing tube, the Venturi tube being placed so as to allow the exhaust gas to blow therethrough, with the external air introducing tube providing communication between the throat of the Venturi tube and the outside of the expansion chamber. Preferably the external air introducing tube has its upper end located outside the expansion chamber and its lower end located within the course of the rush of the exhaust gas from the exhaust port so as to generate negative pressure about the lower end thereof by the rush of the exhaust gas, with the external air introducing tube suctionally introducing external air into the expansion chamber by the negative pressure.

In a muffler of the present invention, external air is suctionally introduced into the expansion chamber by the external air intake means utilizing the rush of the exhaust gas. The introduction of external air into the expansion chamber increases the amount of $O_2$ in the expansion chamber, thereby to promote oxidation of CO. In consequence, CO content of the exhaust gas discharged to the outside is markedly reduced.

In this connection, as a means for supplying external air into the expansion chamber, an external device such as an air pump could be used. However, such a device is not recommended for use in a small air-cooled two-cycle gasoline engine in a hand-held working machine from the viewpoints of weight, cost, operability and the like. In contrast thereto, the external air intake means of the present invention has a simple structure and is economically advantageous.

In a preferred embodiment of the muffler according to the present invention, an exhaust gas cooling means is provided in the vicinity of an exhaust gas discharge port for discharging the exhaust gas from the expansion chamber to the outside, with the exhaust gas cooling means mixing external air in the exhaust gas by the rush of the exhaust gas about to be discharged.

In a further preferred embodiment of the muffler according to the present invention, the expansion chamber is vertically divided into a first expansion chamber and a second expansion chamber by a partition plate, and an oxidation catalyst member is mounted as an exhaust gas cleaner on the partition plate in such a manner that the exhaust gas from the exhaust port is led from the first expansion chamber through the exhaust gas cleaner into the second expansion chamber, and the first expansion chamber is provided with the external air intake means.

In still another preferred embodiment, the oxidation catalyst member comprises a gas-permeable foam.

DESCRIPTION OF THE PREFERRED EMBODIMENTS

In the following, embodiments of the present invention will be described with reference to the accompanying drawings.

Figure 1:
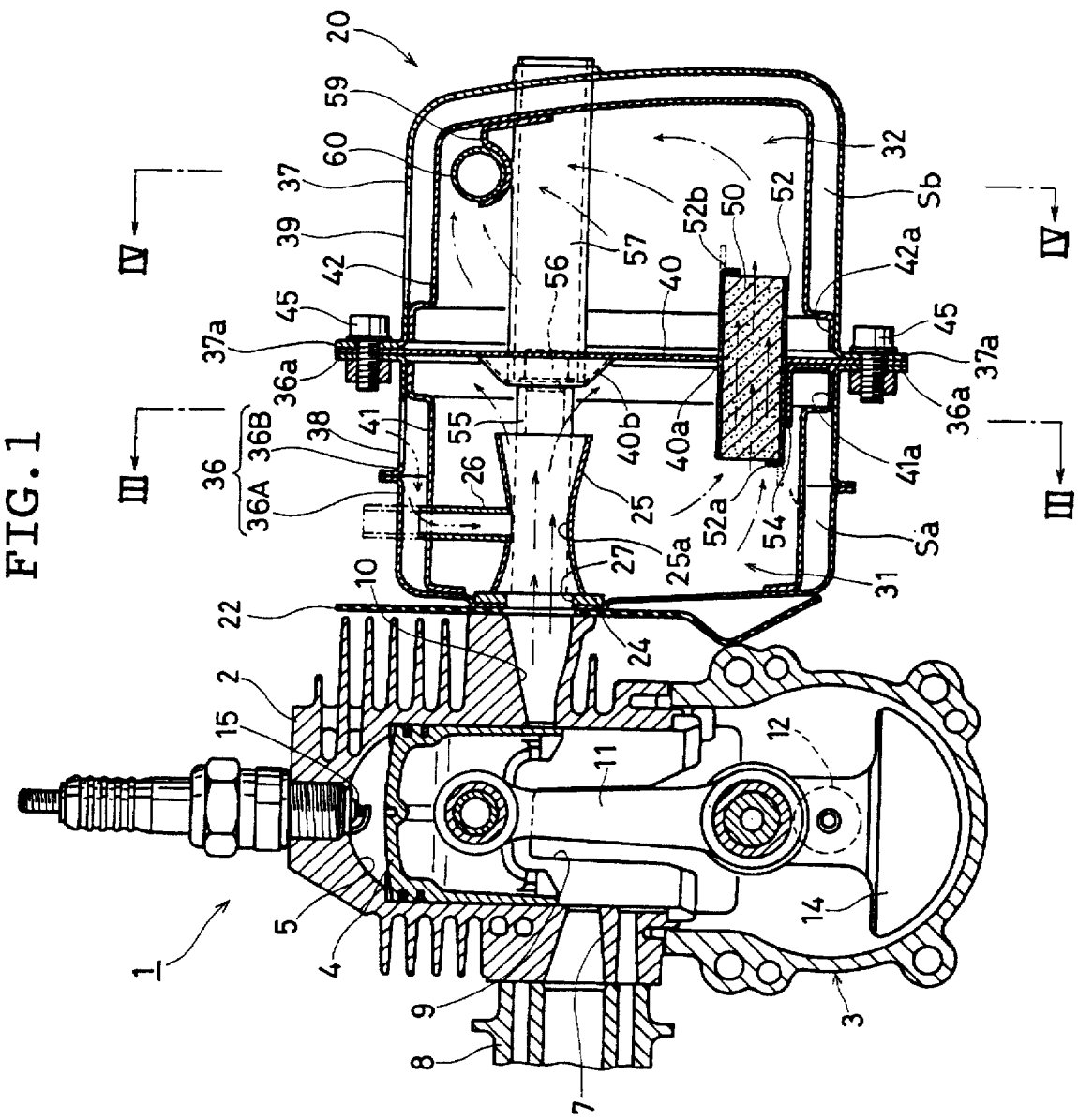
FIG. 1 is a vertical sectional view showing one embodiment of the muffler according to the present invention in combination with a two-stroke engine on which the muffler is mounted.
Figure 2:
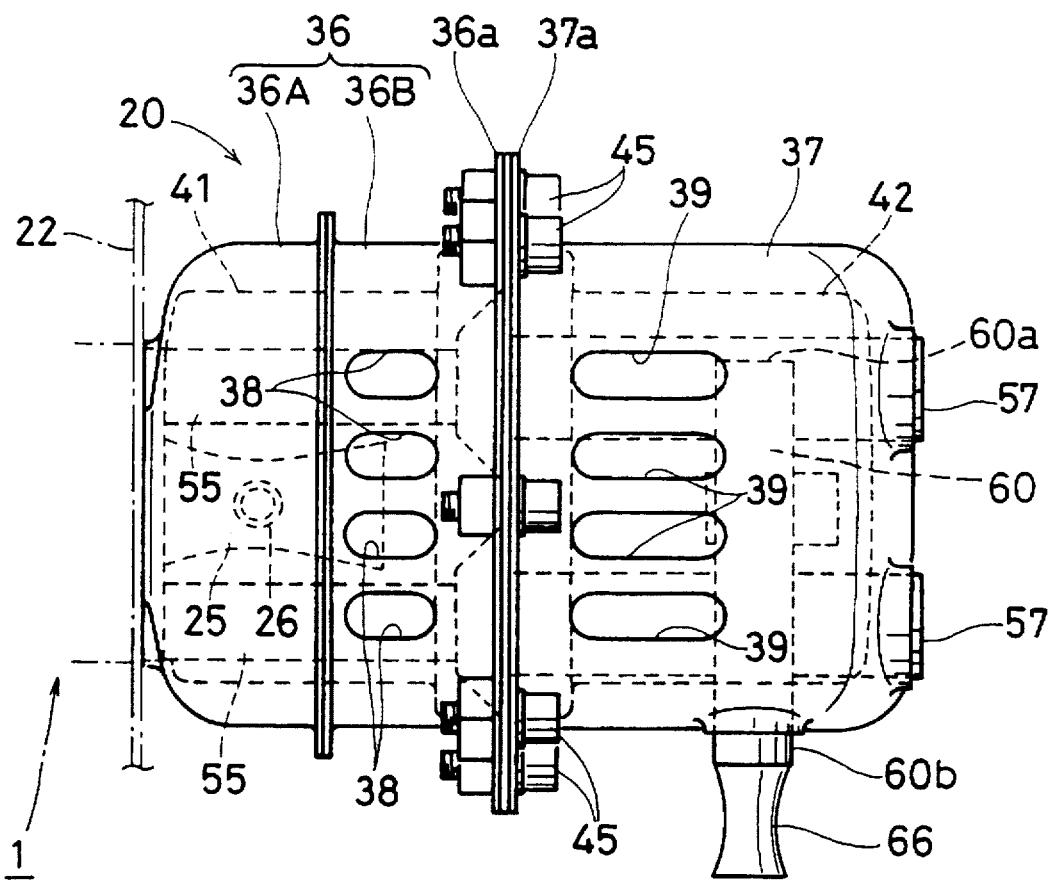
FIG. 2 is a plan view of the muffler shown in FIG. 1.

FIGS. 1 and 2 show one embodiment of the muffler according to the present invention in combination with a two-stroke engine. In the illustrated embodiment, an internal combustion engine 1 is a Schnuerrle scavenging type small air-cooled two-stroke gasoline engine (hereinafter referred to simply as internal combustion engine), which is incorporated as a power source into a hand-held working machine such as a brush cutter or chain saw and whose displacement is, for example, about 23 cc. The internal combustion engine 1 comprises a cylinder 2 having a hemispherical combustion chamber 5 equipped with a spark plug 15, a crank case 3 connected to the bottom of the cylinder 2, and a piston 4 inserted in the cylinder 2. The internal combustion engine 1 is provided with an intake port 7 connected to an air-fuel mixture supply path 8 of a carburetor and an exhaust port 10 connected to a muffler 20 which is described below, at the left side and the right side thereof when viewed in FIG. 1, respectively, and with a pair of scavenging ports (not shown) at the front side and the rear side thereof, respectively. These ports are provided at the internal combustion engine 1 in respective predetermined manners.

As in a customary internal combustion engine, vertical reciprocating motion of the piston 4 is converted into rotational motion of a crank shaft 12, on which a balance weight 14 is mounted, via a connecting rod 11, and the output force of the crank shaft 12 is utilized as driving force of the hand-held working machine.

The muffler 20 of this embodiment is attached to the mouth of the exhaust port 10 in the cylinder 2 of the internal combustion engine 1 via a heat insulating plate 22. The muffler 20 has an expansion chamber divided into a first expansion chamber 31 and a second chamber 32 by a partition plate 40 extending in the vertical direction (in parallel with the longitudinal direction of the internal combustion engine 1). As the partition plate 40, a stainless steel (SUS) plate having a thermal conductivity as low as one-third of that of a usual carbon steel plate is used.

Figure 3:
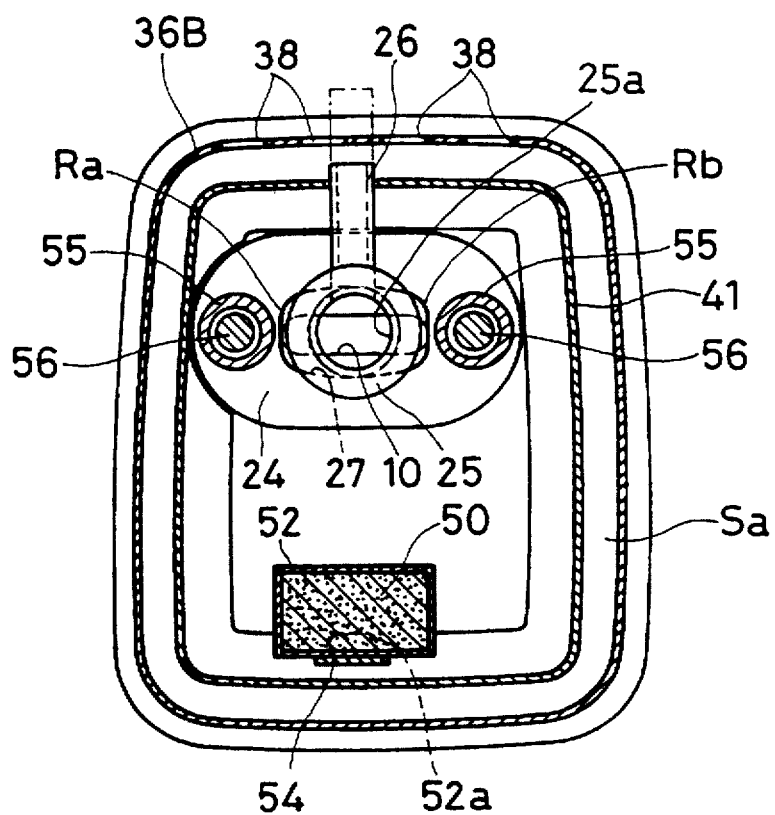
FIG. 3 is a sectional view taken along the line III—III and viewed in the direction of the arrows in FIG. 1.

The first expansion chamber 31 is delimited by a double-walled portion which comprises a rectangular pipe-like inner wall panel 41 having right and left openings when viewed in FIG. 1 and a box-like outer wall panel 36 having a right opening when viewed in FIG. 1, and by the partition plate 40, thereby having a rectangular parallelepipedic shape (see also FIG. 3). The outer wall panel 36 is lined with a reinforcing plate 24 at a position corresponding to that of the mouth of the exhaust port 10 and provided with an exhaust gas introducing port 27 for introducing a rush of exhaust gas from the exhaust port 10 into the muffler 20 (see FIGS. 1 and 3).

The inner wall panel 41 and the outer wall panel 36 are combined in such a manner that bent portions 41a of the inner wall panel 41, one of which is proximate to the internal combustion engine 1 and the other of which is opposite thereto, and facing-portions of the outer wall panel 36 are joined by welding, for example, and that the remaining portions thereof are spaced an appropriate distance apart from each other, thereby providing an air gap 5a. The outer wall panel 36 comprises a panel 36A proximate to the internal combustion engine 1 and a distal panel 36B which have their bent edges butt-joined together.

The second expansion chamber 32 is delimited by a double walled portion which comprises a box-like inner wall panel 42 having a left opening and a box-like outer wall panel 37 having a left opening when viewed in FIG. 1, and by the partition plate 40, thereby having a rectangular parallelepipedic shape. The inner wall panel 42 and the outer wall panel 87 are combined together in such a manner that a bent portion 42a of the inner wall panel 42, which is proximate to the internal combustion engine 1, and a facing-portion of the outer wall panel 37 are joined by welding, for example, and that the remaining portions thereof are spaced an appropriate distance apart from each other, thereby providing an air gap Sb therebetween.

The partition plate 40 is peripherally held between brims 36a, 37a of the outer wall panels 36, 37 constituting outer walls of the first and second expansion chambers 31, 32, respectively, and air-tightly clamped by a predetermined number of bolts-nuts 45.

Shown in FIG. 2, the tops of the outer wall panels 36 (36B), 37 are provided with a required number (in this case, four each) of oblong or track-shaped openings 38, 39 in line abreast near the partition plate 40.

In a lower portion of the partition plate 40, an oxidation catalyst member 50 is placed as an exhaust gas cleaner through the partition plate 40 so as to protrude into both the first expansion chamber 31 and the second expansion chamber 32 comprising a gas-permeable foam having a rectangular parallelepipedic shape. Specifically, in a lower portion of the partition plate 40, a rectangular catalyst member mounting opening 40a is formed. A shell 52 made of stainless steel (SUS) in the form of a rectangular pipe is inserted through the catalyst member mounting opening 40a, and the shell 52 is affixed to the partition plate 40 by a L-shaped fixing member 54 made of a metal. The oxidation catalyst member 50 is fitted into the shell 52, and clicks 52a, 52b which are provided at the center of the left end of the bottom and the center of the right end of the top of the shell 52 when viewed in FIG. 1, respectively, are bent from the conditions shown in phantom to the conditions shown by the solid lines to thereby retain the oxidation catalyst member 50.

In this manner, the oxidation catalyst member 50 is retained in the partition plate 40 by the shell 52. This enables an oxidation catalyst member to have a simplified shape, and enables change in size, positional change, replacement, and increase in number of an oxidation catalyst member to be carried out with ease. Further, the shell 52 may be provided with an appropriate number of small apertures or perforations, according to need. This results in a change in catalytic contact area between exhaust gas and the oxidation catalyst member 50. Accordingly, it is possible to control the progress of the catalytic reaction.

Figure 4:
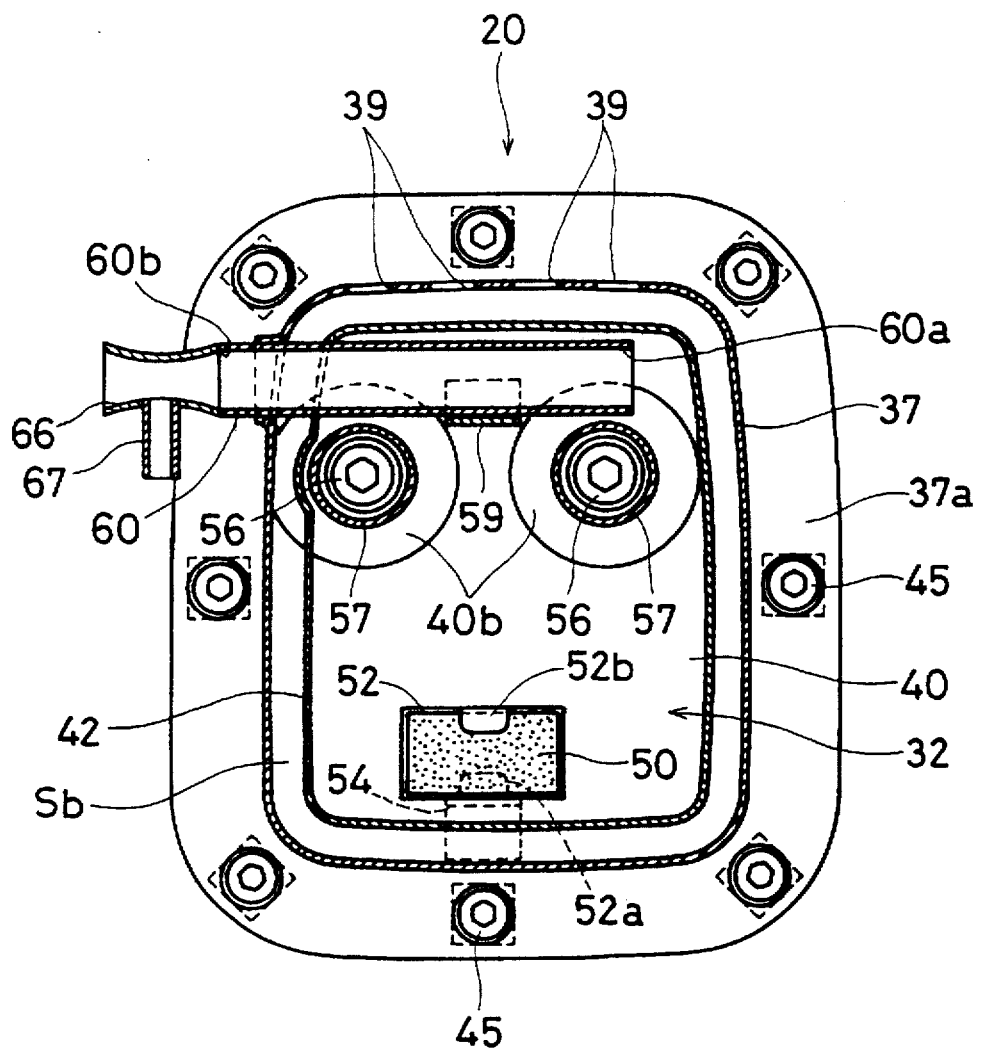
FIG. 4 is a sectional view taken along the line IV—IV and viewed in the direction of the arrows in FIG. 1.

In the partition plate 40 and above the oxidation catalyst member 50, a pair of cavities 40b, 40b are provided so as to protrude into the first expansion chamber 31 at substantially the same level as the exhaust port 10 and the exhaust gas introducing port 27, in which heads of bolts 56 for mounting the muffler 20 on the cylinder 2 of the internal combustion engine 1 are seated (see also FIG. 4).

As shown in FIGS. 2 to 4 as well as FIG. 1, clamping sleeves 55, 55 are fixedly mounted in the first expansion chamber 31 so as to bridgewise connect the reinforcing plate 24 and the cavities 40b, 40b at substantially the same level as the exhaust port 10 and the exhaust gas introducing port 27, and bolt introducing sleeves 57, 57 are fixedly mounted in the second expansion chamber 32 coaxially with the clamping sleeves 55, 55.

When the muffler 20 is externally mounted on the cylinder 2, the bolts 56, 56 are introduced from the right side (when viewed in FIG. 1) of the muffler 20 through the bolt introducing sleeves 57, 57 into the clamping sleeves 55, 55 and then turned to screw externally-threaded leading end portions of the bolts 56, 56 into internal threads (not shown) provided in the wall of the cylinder 2, thereby tightly clamping the muffler 20 and the cylinder 2 together via the partition plate 40 and the clamping sleeves 55, 55.

In this connection, when the muffler 20 is mounted on the internal combustion engine 1, it might be possible to use bolts each of which has a length such that it traverses the second expansion chamber 32 and the first expansion chamber 31, thereby to be screwed from the right side (when viewed in FIG. 1) of the muffler 20 into the cylinder 2. However, use of such bolts is likely to lead to lack of stability and sureness in mounting because the bolts are extremely long. In contrast thereto, in the present embodiment, the bolts are screwed via the partition plate 40, thereby allowing the bolts to have reduced length and to achieve increased strength of the muffler 20. Also, the cavities 40b, 40b provided in the partition plate 40 allow the bolts 56, 56 to have a further reduced length. Accordingly, the muffler 20 can be mounted securely on the internal combustion engine 1, in a stable condition.

Further, the cavities 40b, 40b function as reinforcing ribs of the partition plate 40 to increase structural strength of the partition plate 40, and they serve to dampen vibrations caused by exhaust gas pulses and the like.

In the vicinity of the upper right corner (when viewed in vertical section in FIG. 1) of the second expansion chamber 32, a tail pipe 60 providing an exhaust gas discharge port for discharging an exhaust gas to the outside is supported by a supporting bracket 59 perpendicularly to the bolt introducing sleeves 57. As shown in FIG. 4 as well as FIG. 2, the tail pipe 60 is placed in such a manner that its one end 60a is located in the vicinity of the upper right corner (when viewed in plan in FIG. 2) which is one of substantially the farthest positions from the oxidation catalyst member 50, and the other end 60b as an exhaust gas discharge end is located so as to slightly protrude from the outer wall panel 37. The tail pipe 60 has its length, bore diameter and the like selected so as to have optimum dimensions with respect to output increase and noise reduction.

The muffler 20 of this embodiment has a relatively large volume as compared with those mounted on an internal combustion engine of the same order of displacement as that of the internal combustion engine 1. Specifically, the muffler 20 has a volume of about 1.5 to 2 times those of the above-mentioned conventional examples 1 and 2 (about 18 times the displacement).

In addition to the above-described structural features, the muffler of this embodiment has an external air intake means provided in immediate proximity of the exhaust gas introducing port 27 in the first expansion chamber 31 for suctionally introducing external air by a rush of introduced exhaust gas.

The external air intake means comprises a Venturi tube 25 with a throat 25a which is placed along the direction of the rush of the exhaust gas so as to allow the exhaust gas to rush therethrough, and an external air introducing tube 26 which provides communication between the throat 25a and the air gap Sa. The Venturi tube 25 and the external air introducing tube 26 are affixed to the reinforcing plate 24 and the inner wall panel 41, respectively, by welding or the like. In this embodiment, the Venturi tube 25 has an upstream diameter slightly smaller than the width of the exhaust port 10 (substantially the same as the width of the exhaust gas introducing port 27) of the internal combustion engine 1. As shown in FIG. 3, the Venturi tube 25 does not completely cover the outer end of the exhaust port 10 and the exhaust gas introducing port 27, and gaps Ra, Rb are thereby formed between the contours of the Venturi tube 25 and the ports 10, 27 when viewed from a position downstream therefrom. This is for ease of manufacture of the Venturi tube 25, and also for the following reason. By forming the gaps Ra, Rb, the rush of the exhaust gas is in part permitted to bypass the Venturi tube 25. Accordingly, the flow of the exhaust gas undergoes no substantial retardation. This results in a smooth gas exchange in the combustion chamber 5, thereby minimizing power loss.

Figure 9:
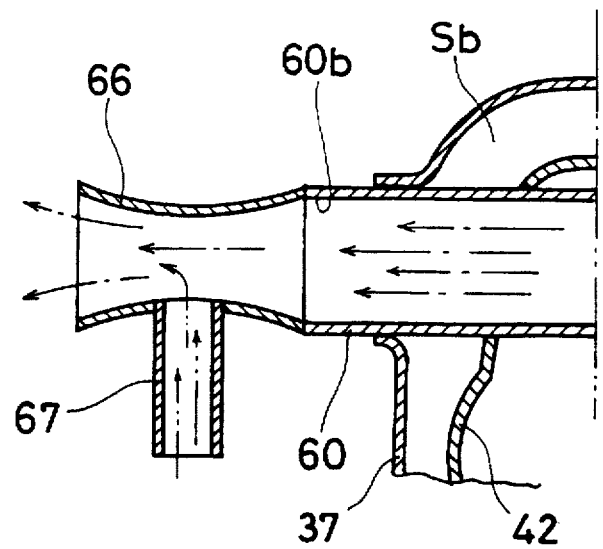
FIG. 9 is an enlarged sectional view illustrating one form of the exhaust gas cooling means used in the muffler shown in FIG. 1.

As shown in FIGS. 4 and 9, on the other end 60b of the tail pipe 60, an exhaust gas cooling means comprising a Venturi tube 66 and an external air introducing tube 67 is provided for mixing external air in the exhaust air by means of a rush of the exhaust gas about to be discharged.

In the muffler 20 of this embodiment, the rush of the exhaust gas from the exhaust port 10 of the internal combustion engine 1 is first introduced into the first expansion chamber 31 while passing mainly through the Venturi tube 25 and partly through the gaps Ra, Rb at near-sonic speed and consequently expanded and diffused there, as shown by the chain-dotted arrows in FIG. 1, thereby achieving reduced exhaust noise.

The exhaust gas thus introduced in the first expansion chamber 31 is then forced to permeate into the oxidation catalyst member 50 placed through the partition plate 40, from an exposed side of the oxidation catalyst member 50, and then led into the second expansion chamber 32 through pores formed in the oxidation catalyst member 50, by a pressure difference between the first expansion chamber 31 and the adjoining second expansion chamber 32 separated therefrom by the partition plate 40. In the passage through the oxidation catalyst member 50, the exhaust gas is efficiently reacted with oxygen brought from the first expansion chamber 31, i.e., it is efficiently subjected to combustive oxidation, by the catalytic action of the oxidation catalyst member 50. The thus cleaned exhaust gas in the second expansion chamber 32 is discharged to the outside via the tail pipe 60 and the Venturi tube 66 mounted on the other end 60b of the tail pipe 60.

When the exhaust gas passes through the Venturi tube 25 as a constituent of the external air intake means, negative pressure is generated about the lower end of the external air introducing tube 26 connected to the throat 25a of the Venturi tube 25, by the rush of the exhaust gas. Ambient air external to the outer wall panel 36 is thereby suctionally introduced through the openings 38 formed in the outer wall panel 36 into the air gap Sa, and therefrom suctionally introduced through the external air introducing tube 26 into the Venturi tube 25, as shown by the chain-double dotted arrows in FIG. 1. In consequence, external air is supplied into the first expansion chamber 31 together with the exhaust gas.

When external air is suctionally introduced into the first expansion chamber 31 as described above, the amount of $O_2$ in the first expansion chamber 31 is increased to promote oxidation of CO. Consequently, CO content of the exhaust gas is greatly reduced.

To demonstrate this effect, as well as the muffler 20 of this embodiment, one having a structure such that the muffler 20 is provided with no external air intake means comprising the Venturi tube 25 and the external air introducing lube 26, i.e., one having a structure such that no external air is suctionally introduced into the first expansion chamber 31 (conventional example A), and one having a structure such that the oxidation catalyst member 50 is removed from the muffler 20 (conventional example B) were prepared. Using these, comparative experiments were carried out under the same conditions. The results are shown in FIGS. 11 and 12.

Figure 11:
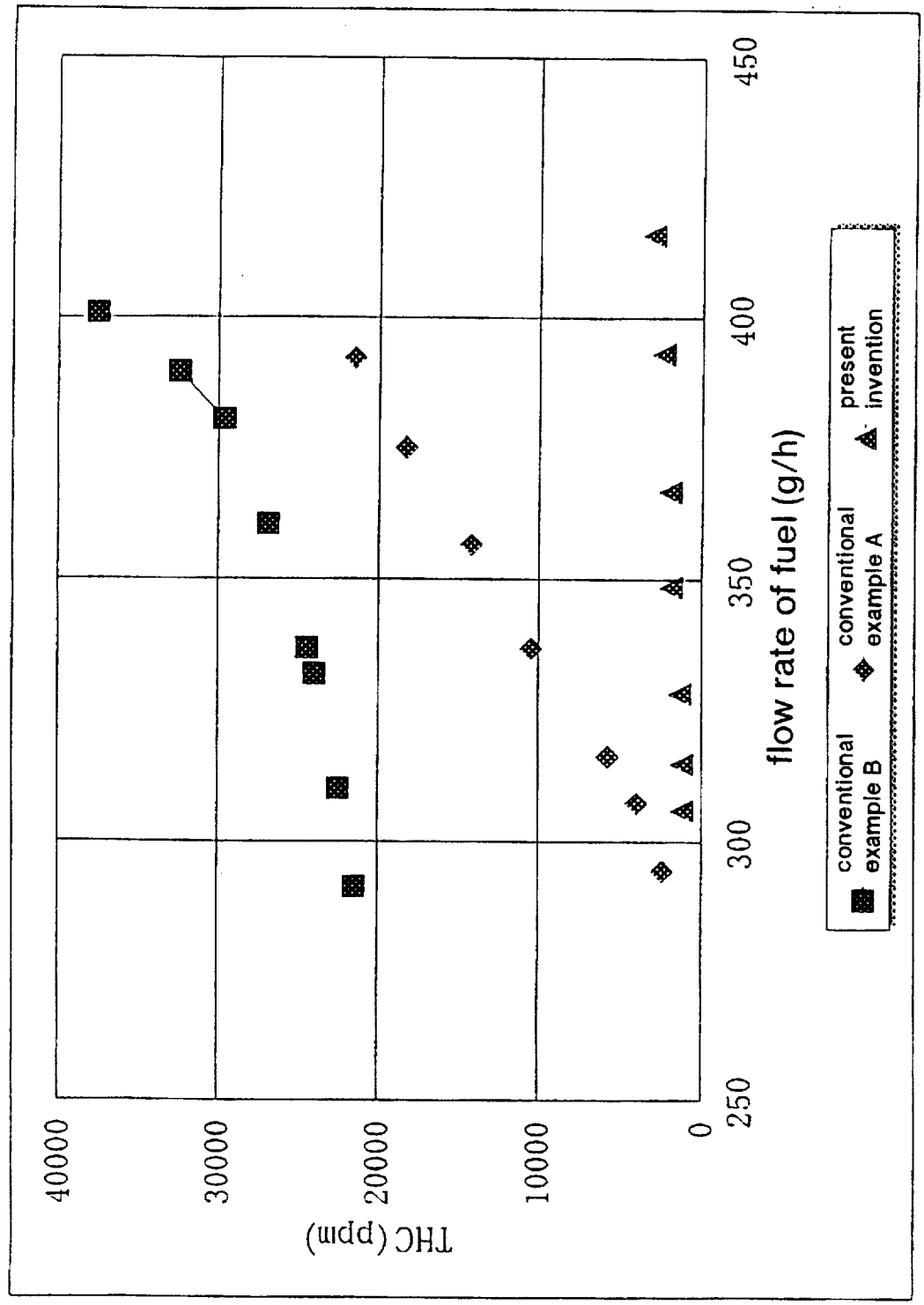
FIG. 11 is a graph showing results of Comparative Experiments on THC content between the muffler shown in FIG. 1 and conventional ones.
Figure 12:
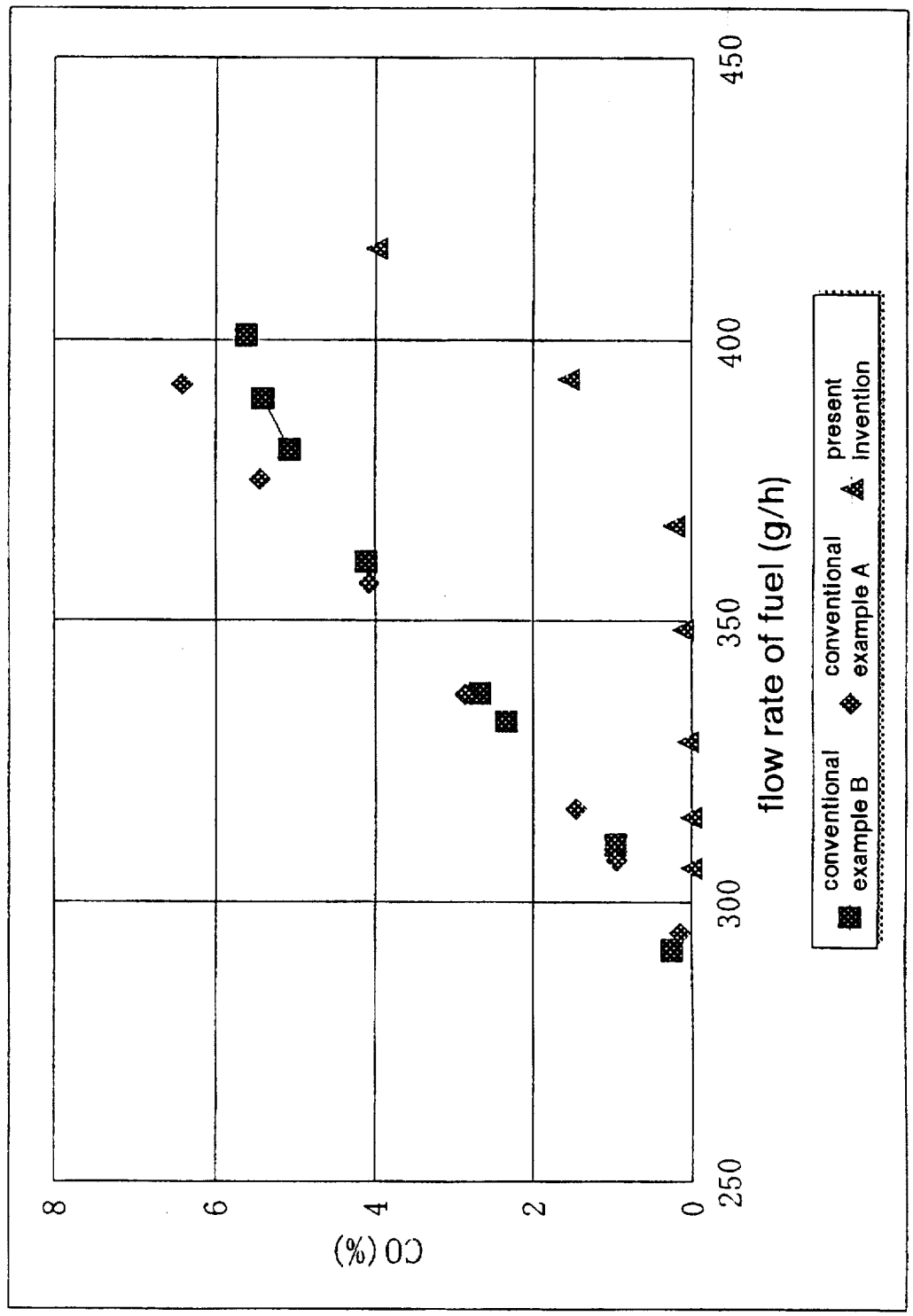
FIG. 12 is a graph showing results of Comparative Experiments on CO content between the muffler shown in FIG. 1 and conventional ones.

FIGS. 11, 12 show that both CO and THC contents of the exhaust gas are markedly reduced in the muffler 20 of this embodiment as compared with the conventional examples A, B.

When the exhaust gas is discharged from the tail pipe 60 to the outside, external air is suctionally introduced through the external air introducing tube 67 into the Venturi tube 66 and mixed in the exhaust gas about to be discharged in the same manner as in the external air intake means, as shown in FIG. 9, thereby effectively decreasing the temperature of the exhaust gas.

Further, in the muffler 20 of this embodiment, the expansion chamber is vertically divided into the first expansion chamber 31 and the second expansion chamber 32 by the partition plate 40. Accordingly, this embodiment has the advantage that formation of a protrusion such as a boss in the side thereof abutting upon the internal combustion engine 1 is avoidable, or a number of protrusions formed in the side can be minimized, thereby attaining improved mounting properties and assembling properties as compared with one having its expansion chamber horizontally or longitudinally divided into halves by a partition plate. The muffler of this embodiment has further advantages in that the volume of the muffler 20, the volume ratio between the first expansion chamber 31 and the second expansion chamber 32, and the like can readily be changed as compared with one having its expansion chamber horizontally or longitudinally divided into halves by a partition plate.

Moreover, the oxidation catalyst member 50 comprising a gas-permeable foam metallic member having a rectangular parallelepipedic shape is used as an exhaust gas cleaner. By virtue of this, clogging is considerably diminished, thereby leading to reduced gas-flow resistance and power loss.

Furthermore, sides of the first and second expansion chambers 31, 32 other than the side abutting upon the internal combustion engine 1 are constituted of the double-walled portions comprising respectively the inner wall panels 41, 42 and the outer wall panels 36, 37, which inner and outer wall panels are spaced an appropriate distance apart from each other, so as to provide air gaps Sa, Sb. Accordingly, the temperature of the peripheral surface of the muffler 20 is decreased.

In addition, since the tops of the outer wall panels 36 (36B), 37 are provided with a required number of the openings 38, 39 near the partition plate 40, thermal expansion of air in the air gaps Sa, Sb due to temperature increase is reduced. Further, the air having raised temperature in the air gap Sa of the first expansion chamber 31 is suctionally introduced into the muffler 20 to promote cooling. The air gaps Sa and Sb may be in communication with each other to circulate cool air throughout the peripheral portion of the muffler 20, thereby cooling the muffler 20 over-all.

Still further, one end of the tail pipe 60 is located at substantially the farthest position from the oxidation catalyst member 50. Accordingly, the temperature of the exhaust gas is effectively reduced before it is discharged to the outside.

In the foregoing, one embodiment of the present invention has been described in detail. However, it is to be understood that the present invention is by no means restricted to the above-described embodiment and that various modifications may be made within the scope without departing from the spirit of the present invention as defined in the claims.

Figure 5:
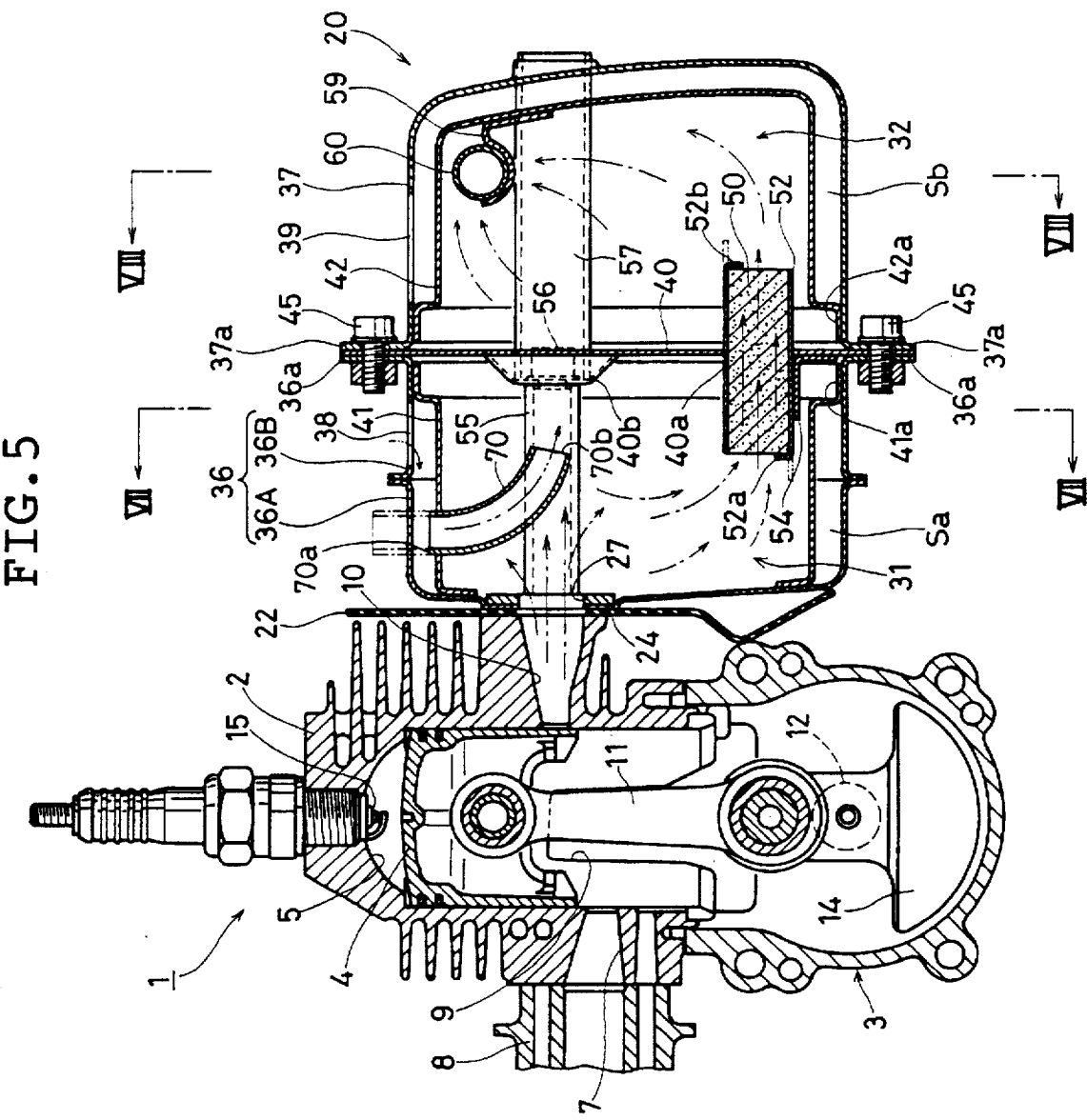
FIG. 5 is a vertical sectional view showing another embodiment of the muffler according to the present invention in combination with a two-stroke engine on which the muffler is mounted.
Figure 6:
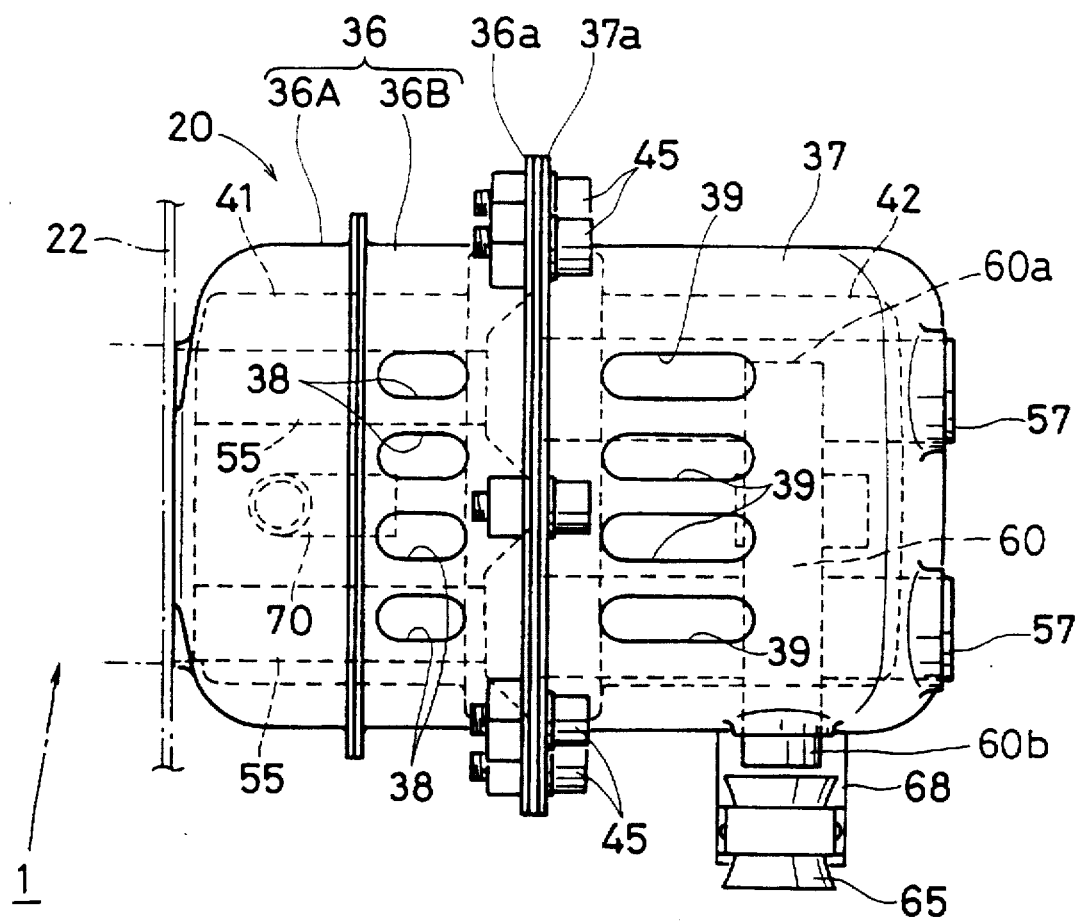
FIG. 6 is a plan view of the muffler shown in FIG. 5.
Figure 7:
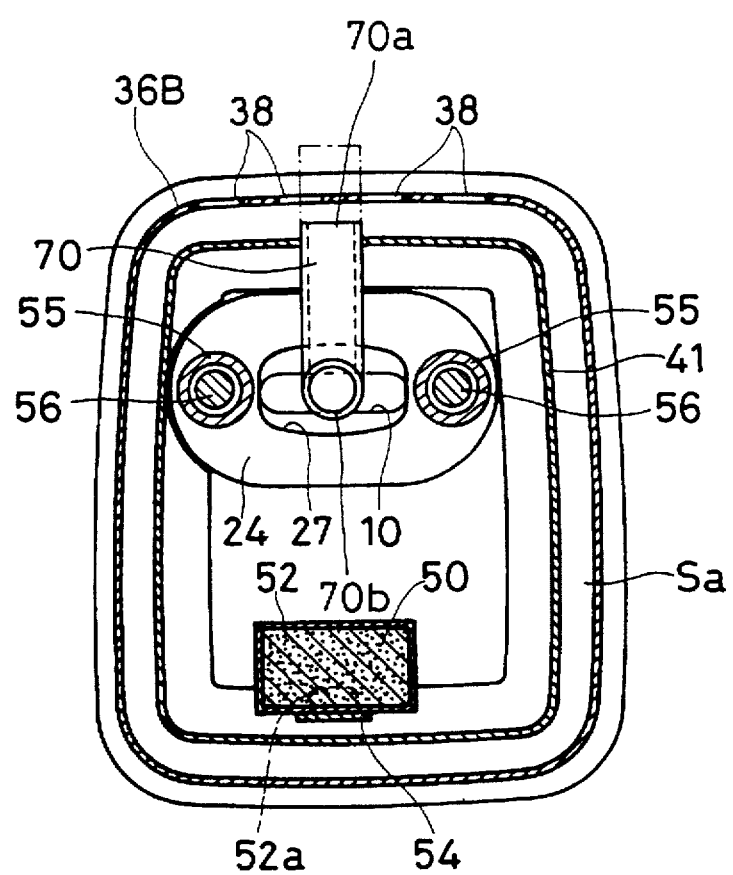
FIG. 7 is a sectional view taken along the line VII—VII and viewed in the direction of the arrows in FIG. 5.

For example, as the external air intake means, an alternative may be used instead of the above-described external air intake means comprising the Venturi tube 25 and the external air introducing tube 26. Specifically, a curved external air introducing pipe 70 can be used whose upper end 70a is located outside the first expansion chamber 31 and whose lower end 70b is located within the course of the rush of the exhaust gas with its opening facing downstream as shown in FIGS. 5 to 7. By utilizing negative pressure which is generated about the lower end 70b by the rush of the exhaust gas, external air is suctionally introduced into the first expansion chamber 31. In the alternative form of the external air intake means, substantially the same effect as in the above-described form is obtained.

Figure 8:
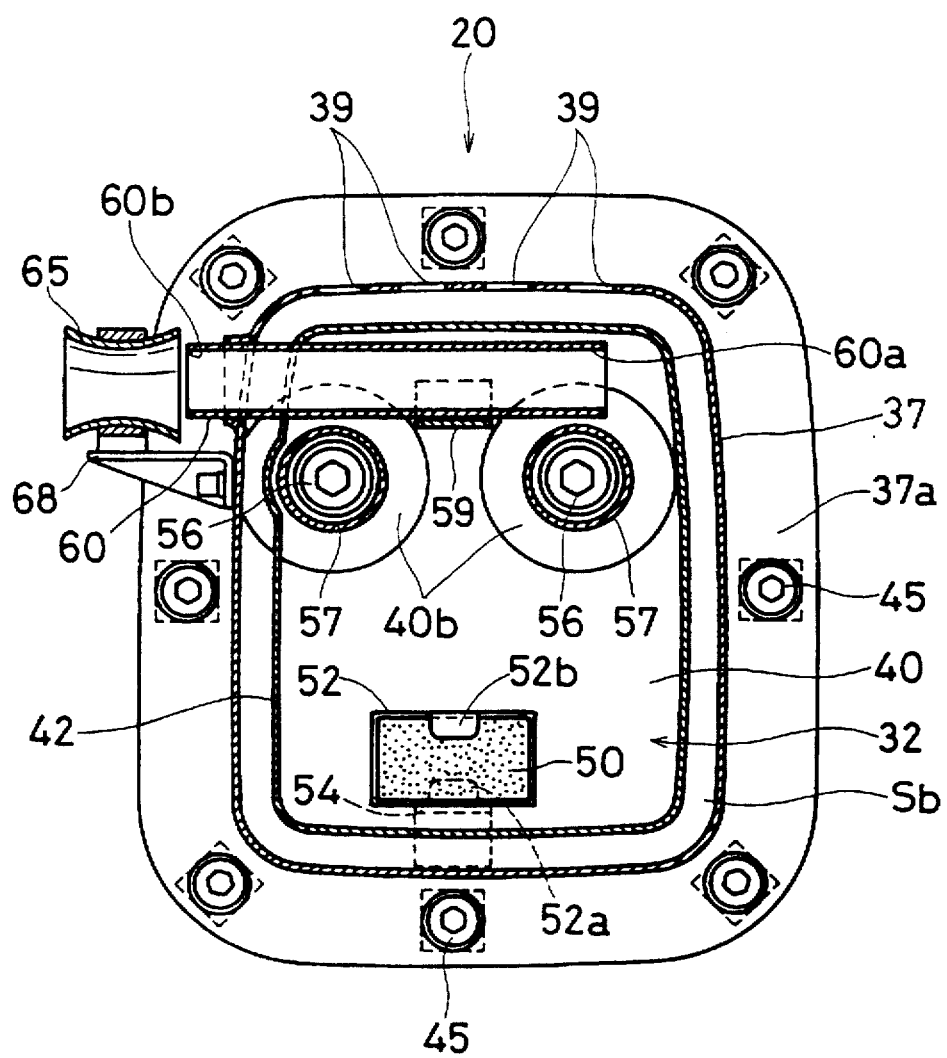
FIG. 8 is a sectional view taken along the line VIII—VIII and viewed in the direction of the arrows in FIG. 5.
Figure 10:
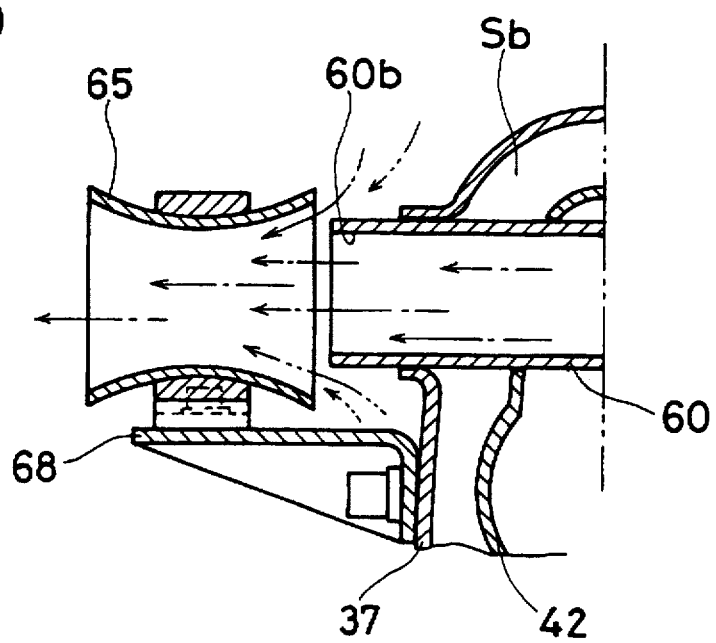
FIG. 10 is an enlarged sectional view illustrating another form of the exhaust gas cooling means used in the muffler shown in FIG. 5.

Further, as the exhaust gas cooling means, an alternative may be used instead of the above-described exhaust gas cooling means comprising the Venturi tube 66 and the external introducing tube 67. Specifically, a Venturi tube 65 may be used which is supported by a supporting member 68 so as to be spaced apart slightly from the other end 60b of the tail pipe 60, thereby introducing external air from the gap thus provided between the other end 60b of the tail pipe 60 and the Venturi tube 65, as shown in FIGS. 8 and 10.

In addition, the exhaust gas cleaner 50 may comprise a metallic or ceramic matrix or the like. The exhaust gas cleaner 50 may be mounted on the partition plate 40 in various manners, for example, by adhesion.

In the above-described two forms of external air intake means, the upper end of each of the external air introducing tube 26 connected to the Venturi tube 25 and the curved external air introducing pipe 70 is located in the air gap Sa provided between the outer wall panel 36 and the inner wall panel 41, and external air is suctionally introduced from the openings 38 provided in the outer wall panel 36 into the first expansion chamber 31 via the air gap Sa. Accordingly, air in the air gap Sa is also introduced into the first expansion chamber 31 and replaced by the introduced external air. As a result, cooling of the first expansion chamber 81 is enhanced.

The air gaps Sa, Sb are separately formed in the above embodiment. However, the air gaps may be in communication with each other to form a suite of air gaps (or a single air gap). With such a suite of air gaps (or a single air gap), the upper end of the external air introducing tube 26 or the curved external air introducing pipe 70 is located in the suite of air gaps (or the single air gap), and an appropriate number of openings are provided at appropriate positions in the outer wall panels 36, 37. In such a structure, external air is introduced throughout the suite of air gaps (or the single air gap) to displace the air therein. Consequently, the second expansion chamber 32 as well as the first expansion chamber 81, i.e., the entire muffler 20 is effectively cooled.

Further, as shown in phantom in FIGS. 1 and 5, the external air introducing tube 26 or the curved external air introducing pipe 70 may be prolonged upwardly through the outer wall panel 36 so as to directly introduce external air without passing through the air gap Sa. This form has an advantage in that external air is introduced which has not yet been exposed to the heat of the muffler and thus has a lower temperature. In this form, however, foreign matter, dust or the like is likely to enter the muffler 20 through the external air introducing tube 26 or the external air introducing pipe 70. Accordingly, preventative measures are desirable. For example, the opening of the upper end of the external air introducing tube 26 or the curved external air introducing pipe 70 can be covered with a filter or the upper end portion thereof can be bent.

The external air intake means is not restricted to the above-described two forms but may be in different forms. Other forms of the external air intake means are shown in FIGS. 13, 14 and 15 by way of examples.

Figure 13:
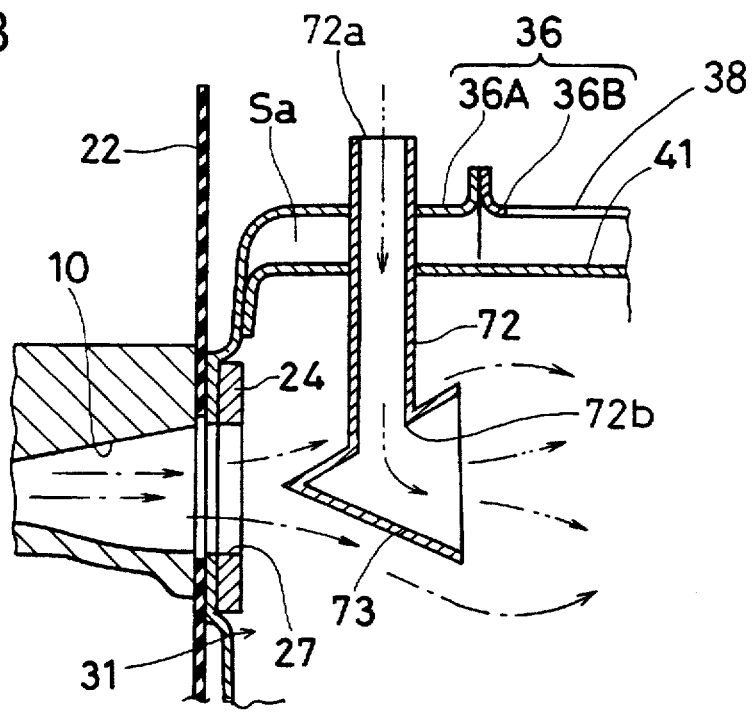
FIG. 13 is an illustrative view of another form of the external air intake means used in the muffler of the present invention.

The external air intake means shown in FIG. 13 comprises an external air introducing tube 72 and a conical hollow member 73. The external air introducing tube 72 has an upper end 72a located outside the outer wall panel 36 or in the air gap Sa, and a lower end 72b connected to the conical hollow member 73 at a position near the vertex of the conical hollow member 73. By a rush of exhaust gas from the exhaust port 10, negative pressure is generated in the conical hollow member 73. The negative pressure is utilized to suctionally introduce external air. According to this form, the efficiency of external air introduction is enhanced further as compared with the external air intake means consisting only of the curved external air introducing pipe 70 as shown in FIG. 5.

Figure 14:
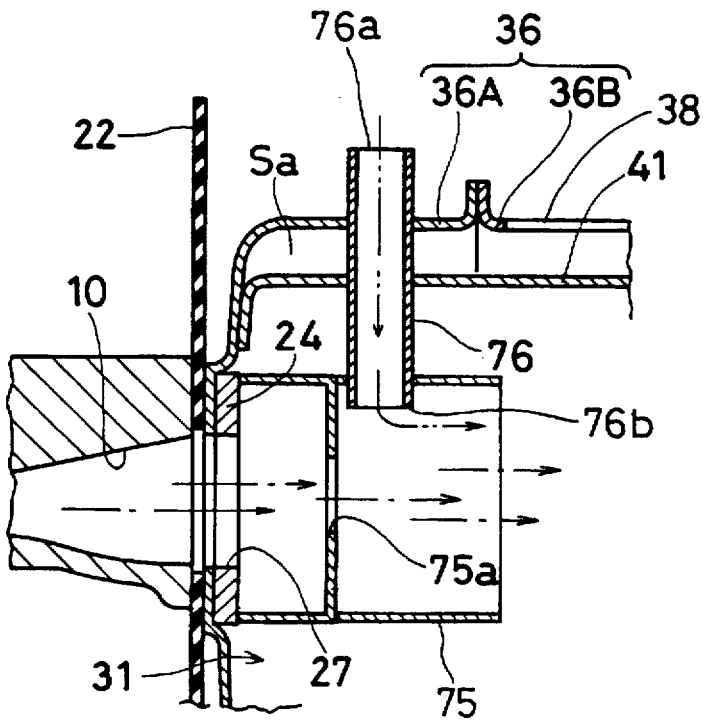
FIG. 14 is an illustrative view of a further form of the external air intake means used in the muffler of the present invention.

The external air intake means shown in FIG. 14 comprises an external air introducing tube 76 and a cylindrical member 75 provided with an orifice 75a. The external air introducing tube 76 has an upper end 76a located outside the outer wall panel 36 or in the air gap Sa, and a lower end 76b located in the vicinity of the orifice 75a. By means of the orifice 75a, the course of a rush of exhaust gas is narrowed to increase the speed of the rush of exhaust gas. Consequently, negative pressure is generated about the orifice 75a. The negative pressure is utilized to suctionally introduce external air. Also in this form, substantially the same effect is realized as in the external air intake means using the Venturi tube 25 shown in FIG. 1.

Figure 15:
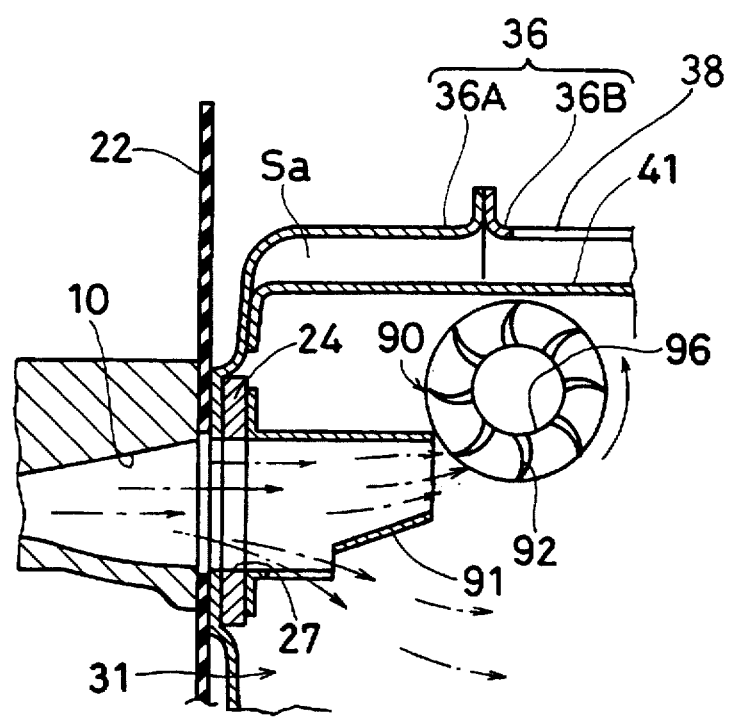
FIG. 15 is an illustrative view of still another form of the external air intake means used in the muffler of the present invention.

The external air intake means shown in FIG. 15 comprises an external air introducing through-hole 96 formed in a side wall of the inner wall panel 41, a vane wheel 90 rotatably mounted on the side wall and concentrically with the external air introducing through-hole 96, and a guide member 91 for leading a portion of the exhaust gas toward vanes 92 of the vane wheel 90. The vane wheel 90 is rotated by a rush of exhaust gas to generate negative pressure about the center of the vane wheel 90 by the rotational motion of the vane wheel 90. The negative pressure is utilized to suctionally introduce external air.

As understood from the above description, according to the muffler for a two-stroke engine of the present invention, CO content of an exhaust gas is effectively reduced by a relatively simple structure.

What is claimed is:

1. A muffler for a two-stroke internal combustion engine, comprising:

an expansion chamber, at least a portion of the expansion chamber having a double wall including an inner wall panel and an outer wall panel which is spaced apart from the inner wall panel, a partition plate in the expansion chamber dividing the expansion chamber into a first expansion subchamber and a second expansion subchamber, the partition plate having a passage communicating the first expansion subchamber and the second expansion subchamber, an exhaust gas introducing port communicating the first expansion subchamber with an exhaust port of the engine for introducing a rush of exhaust gas from the exhaust port of the engine into the first expansion subchamber;

an external air intake means proximate to the exhaust gas introducing port for inducting by suction due to the rush of the introduced exhaust gas external air into the first expansion subchamber, and an exhaust gas cleaner mounted in the passage through the partition plate.

2. The muffler according to claim 1, wherein the external air intake means comprises a Venturi tube having a throat and an external air introducing tube, the Venturi tube being disposed for the exhaust gas to flow therethrough, and the external air introducing tube providing communication between the throat of the Venturi tube and the outside of the expansion chamber.

3. The muffler according to claim 1, wherein the external air intake means comprises an external air introducing pipe having a first end located outside the expansion chamber and a second end located within a course of the rush of the exhaust gas so as to generate negative pressure about the second end by the rush of the exhaust gas, the external air introducing pipe being disposed for suctionally introducing external air into the expansion chamber by a pressure below atmospheric pressure.

4. The muffler according to claim 1, further comprising an exhaust gas cooling means in a vicinity of an exhaust gas discharge port for discharging the exhaust gas from the expansion chamber to the outside, the exhaust gas cooling means being configured and disposed for mixing external air with the exhaust gas by the rush of the exhaust gas about to be discharged.

5. The muffler according to claim 1, wherein the exhaust gas cleaner comprises an oxidation catalyst member.

6. The muffler according to claim 1, wherein the exhaust gas cleaner comprises a gas permeable foam.

* * * * *

UNITED STATES PATENT AND TRADEMARK OFFICE
CERTIFICATE OF CORRECTION

PATENT NO. : 5,738,184
DATED : April 14, 1998
INVENTOR(S) : Masuda, et al

It is certified that error appears in the above-indentified patent and that said Letters Patent is hereby corrected as shown below:

Column 1, line 19, "(THE)" should read --(THC)--;

Column 5, line 5, "(87)" should read --(37)--;

Column 9, line 41, "(81)" should read --(31)--;

Column 9, line 55, "(81)" should read --(31)--.

Signed and Sealed this

Twelfth Day of October, 1999

Attest:

Q. TODD DICKINSON

*Attesting Officer*     *Acting Commissioner of Patents and Trademarks*